(12) United States Patent
Normal, Jr. et al.

(10) Patent No.: US 6,308,384 B1
(45) Date of Patent: Oct. 30, 2001

(54) U-CLAMP WITH ADAPTER

(76) Inventors: McKinley Normal, Jr.; Elizabet A. Normal, both of 4071 Labadie, St. Louis, MO (US) 63107

( * ) Notice: Subject to any disclaimer, the term of this patent is extended or adjusted under 35 U.S.C. 154(b) by 0 days.

(21) Appl. No.: 09/538,220

(22) Filed: Mar. 30, 2000

(51) Int. Cl.[7] .............................. F16L 25/00; B65D 63/00
(52) U.S. Cl. ............................. 24/277; 248/62; 248/74.4
(58) Field of Search ............................ 24/276, 277, 278, 24/279, 284; 248/62, 74.1, 74.4, 230.1; 285/420

(56) References Cited

U.S. PATENT DOCUMENTS

| | | | |
|---|---|---|---|
| 558,391 | * 4/1896 | Israel | 248/74.4 |
| 2,547,813 | * 4/1951 | Conns et al. | 248/74.4 |
| 3,735,950 | * 5/1973 | Paintin | 248/62 |
| 4,063,700 | * 12/1977 | Brewer | 248/62 |
| 4,209,155 | * 6/1980 | Florian | 248/62 |
| 4,407,050 | 10/1983 | Offterdinger . | |
| 4,415,188 | 11/1983 | Ginter, Jr. . | |
| 4,479,288 | 10/1984 | Jones . | |
| 5,205,022 | 4/1993 | Norton . | |

* cited by examiner

Primary Examiner—Robert J. Sandy
(74) Attorney, Agent, or Firm—Patent & Trademark Services; Joseph H. McGlynn

(57) ABSTRACT

A U-clamp which has an adapter plate attached to the U-clamp to securely mount the U-clamp to a supporting surface.

3 Claims, 1 Drawing Sheet

U-CLAMP WITH ADAPTER

BACKGROUND OF THE INVENTION

This invention relates, in general, to clamps, and, in particular, to U-clamps with an adapter to attach the clamp to a supporting surface.

DESCRIPTION OF THE PRIOR ART

In the prior art various types of clamps have been proposed. For example, U.S. Pat. No. 4,407,050 to Offterdinger discloses a U-clamp with an arcuate saddle.

U.S. Pat. No. 4,479,288 to Jones discloses a U-clamp with a saddle having hexagonal sleeves to transform torque on the ends of the saddle.

U.S. Pat. No. 5,205,022 to Norton discloses a U-clamp with a flattened interior surface which allows even distribution of the load from the clamping forces.

U.S. Pat. No. 4,415,188 to Ginter Jr discloses a double U-clamp which is formed from a single one-piece blank.

SUMMARY OF THE INVENTION

The present invention is directed to a U-clamp which has an adapter plate attached to the U-clamp to securely mount the U-clamp to a supporting surface.

It is an object of the present invention to provide a new and improved a new and improved U-clamp.

It is an object of the present invention to provide a new and improved U-clamp which can be used to secure automotive exhaust systems.

It is an object of the present invention to provide a new and improved U-clamp which can be used to secure automotive exhaust systems quickly and easily.

These and other objects and advantages of the present invention will be fully apparent from the following description, when taken in connection with the annexed drawings.

DESCRIPTION OF THE PREFERRED EMBODIMENT

Figure 1:
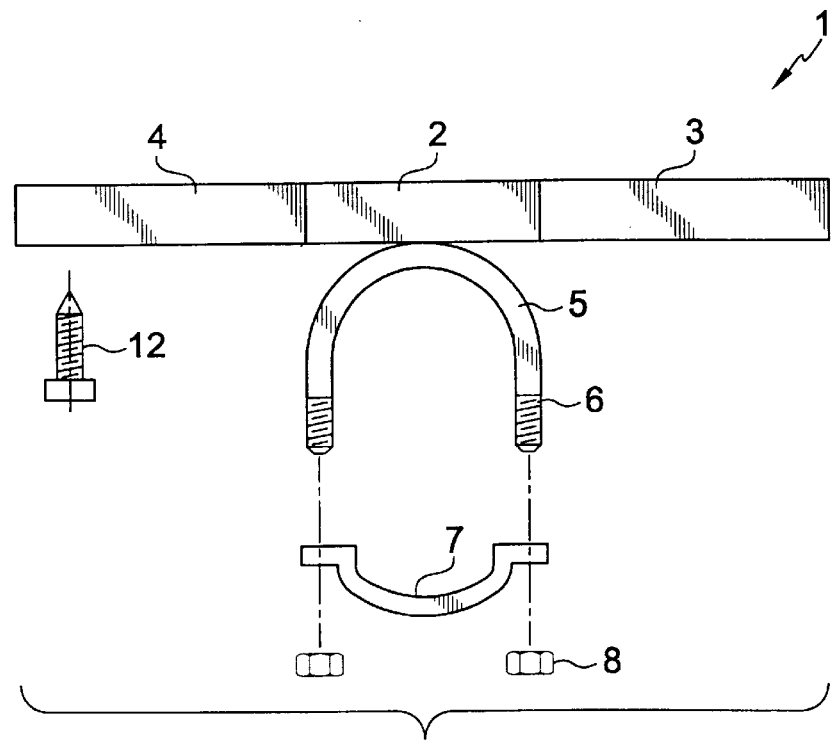
FIG. 1 is an exploded front view of the present invention.

Referring now to the drawings in greater detail, FIG. 1 shows the U-clamp of the present invention. The present invention is designed to be used to secure an automobile exhaust system to the underside of the automobile. The use of U-clamps to perform this function is not per se new, as evidenced by the prior art cited above. However, when a mechanic tries to install a U-clamp onto the automobile exhaust system it is difficult for the mechanic to hold the exhaust system and the U-clamp in place while attempting to screw on the nuts to secure the U-clamp to the exhaust system.

The present invention is designed to overcome this problem. The present invention 1 has a conventional U-clamp 5 which has a curved base and two arms extending therefrom. The ends 6 of the arms have external threads which will accept the nuts 8. A clamping plate 7 is placed onto the arms and secured thereto by the nuts 8. Since the U-clamp is conventional no further description is necessary.

Figure 2:
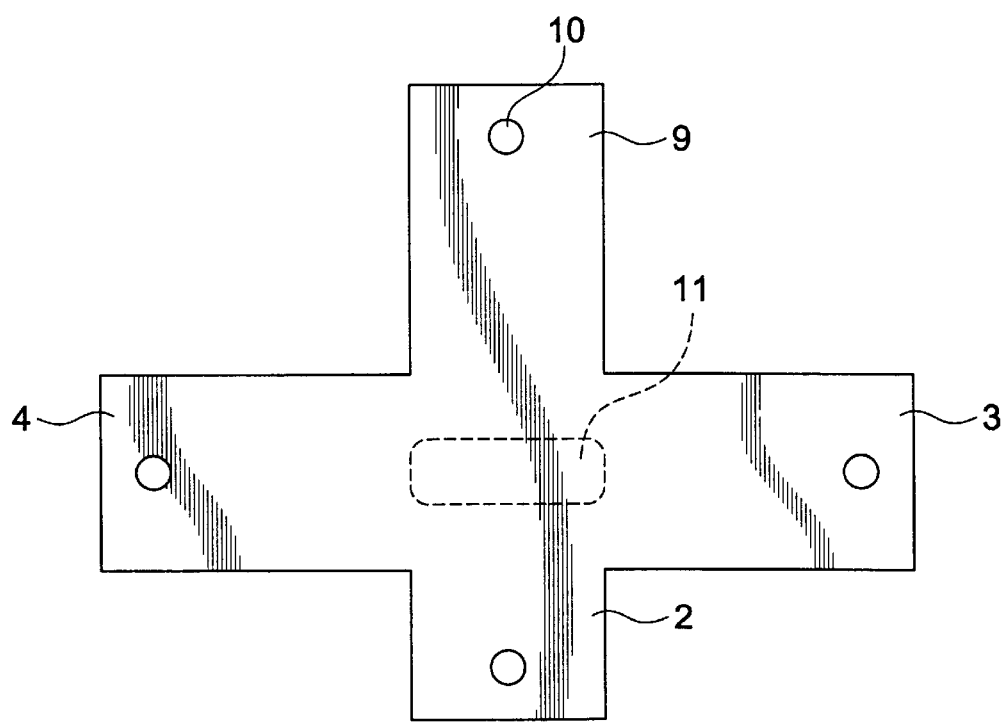
FIG. 2 is a plan view of the adapter used with the present invention.

In order to hold the U-clamp 1 of the present invention securely in place so it is easier to attach it to a conventional automobile exhaust system, a base plate 2, 3, 4, 9 (as seen in FIG. 2) is employed. As shown in FIG. 1, the base plate 2, 3, 4, 9 is secured to the curved portion of the U-clamp 5 at approximately the center of the base plate. This location is indicated by the dotted lines 11 in FIG. 2. The base plate 2, 3, 4, 9 can be secured to the curved portion of the U-clamp 5 in any conventional manner such as, but not limited to welding.

As seen in FIG. 2, the base plate is formed as a cross with four wings or arms 2, 3, 4, 9, respectfully. Each of the arms 2, 3, 4, 9 is provided with an aperture 10. A screw 9, only one of which is shown, (see FIG. 1) is passed through each of the apertures and secured to a portion of the automobile in a position where the U-clamp is needed. This will position and hold the curved portion of the U-clamp 5 so the mechanic will not have to hold it in place. Once the U-clamp 5 is attached to the underside of the automobile by the screws 9, the mechanic merely has to place the portion of the exhaust system to be secured, slide on the plate 7 and secure the nuts 8 to firmly clamp everything in place.

Although the U-clamp with adapter and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A clamp comprising:
    a curved portion and arms extending from said curved portion,
    said arms having fastening means for securing threaded fasteners thereto,
    a pressure plate secured to said clamp by said threaded fasteners,
    a base plate secured to said curved portion of said clamp, and
    wherein said base plate has four arms formed in the shape of a cross, and wherein each of said arms has an aperture extending therethrough.

2. The clamp as claimed in claim 1, wherein a screw passes through each of said apertures to mount said clamp to a support.

3. A clamp comprising:
    a curved portion and arms extending from said curved portion,
    said arms having fastening means for securing threaded fasteners thereto,
    a pressure plate secured to said clamp by said threaded fasteners,
    a base plate secured to said curved portion of said clamp, and
    wherein said base plate has four arms formed in the shape of a cross.

* * * * *

UNITED STATES PATENT AND TRADEMARK OFFICE
CERTIFICATE OF CORRECTION

PATENT NO.     : 6,308,384 B1
DATED          : October 30, 2001
INVENTOR(S)    : McKinley Normal, Jr. and Elizabeth A. Normal It is certified that error appears in the above-identified patent and that said Letters Patent is hereby corrected as shown below:

<u>Title page,</u>
Item [76], inventor's correct names and address should be
-- McKinley Normal, Jr; Elizabeth A. Normal, both of
4071 Labadie Ave., St. Louis, MO (US) 63107 --

Signed and Sealed this

Twenty-second Day of July, 2003

JAMES E. ROGAN
*Director of the United States Patent and Trademark Office*